Oct. 9, 1928.

G. B. CROUSE 1,686,518

BATTLESHIP COMPASS

Filed Dec. 14, 1920     2 Sheets-Sheet 1

Inventor
George B. Crouse
By his Attorney
Herbert H. Thompson

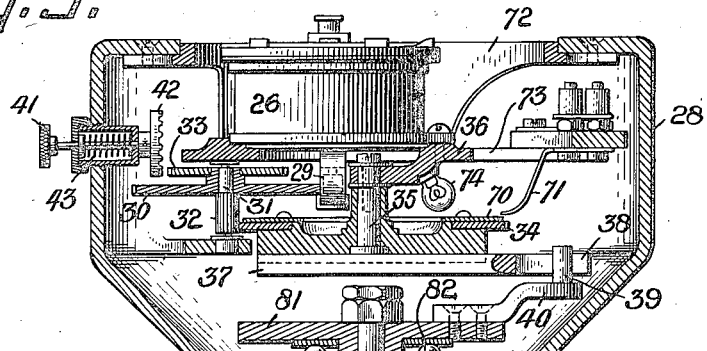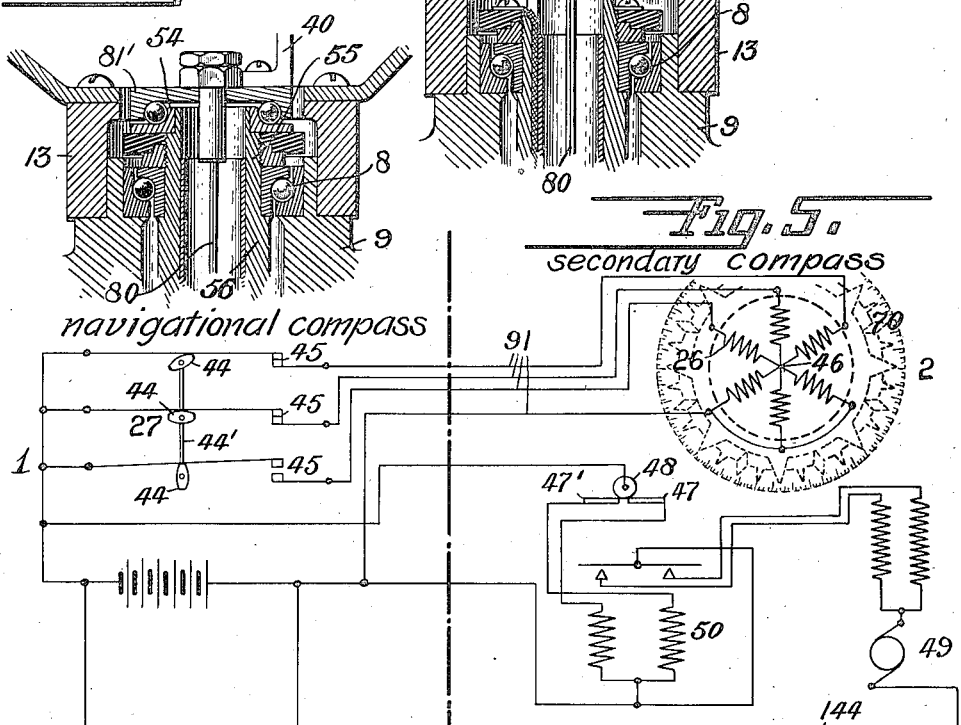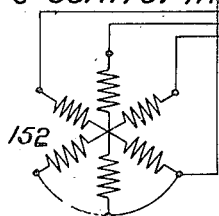

Patented Oct. 9, 1928.

1,686,518

UNITED STATES PATENT OFFICE.

GEORGE B. CROUSE, OF BROOKLYN, NEW YORK, ASSIGNOR TO THE SPERRY GYROSCOPE COMPANY, OF BROOKLYN, NEW YORK, A CORPORATION OF NEW YORK.

BATTLESHIP COMPASS.

Application filed December 14, 1920. Serial No. 430,597.

This invention relates to gyroscopic compasses for ordnance control on warships and other uses requiring a compass of extraordinary accuracy. It has long been the practice for all warships to be equipped with gyroscopic compasses for navigational purposes. Of late years the gyroscopic compass has also been made use of in the intricate and exact ordnance control systems on battleships, the compass being used to control through transmitters and repeater motors various operations in a large number of ordnance instruments, such as plotting indicators, battle tracers, range keepers, etc. In fact the gyro compass may truly be said to be the heart of the modern director firing system. While the standard gyroscopic compass has been found to give excellent results for navigational purposes, certain limitations have developed in using it as an ordnance control device, to overcome which I have devised a new gyroscopic system forming the subject matter of this invention. In ordnance work a very much greater accuracy is required than for navigation for the reason that a 600 ft. target placed at a range of 20,000 yards subtends an angle at the firing ship only fifty-seven hundredths of a degree (.57°) so that the problem of maintaining the lay of the guns in azimuth independent of the heading of the ship is one requiring refinements not required in navigation.

The standard gyroscopic compass in order to have sufficient directive power is made very pendulous. For instance, the standard Sperry battle compass has a pendulous factor of 85 pound inches most of which weight is incorporated in the heavy lead weight or bail mounted underneath the gyroscopic rotor casing. The period of oscillation of such a compass across the meridian is usually between one hour and two hours, 85 minutes being employed in the Sperry battle compass. It can readily be seen, however, that with a compass of this type each change in the ship's course or speed produces an accelerating force on the pendulous gyroscope, thereby causing temporary deviation and oscillation. Also, of course, for each change in speed or course the compass has a new settling point since, as is well known, the course and speed of the ship affect the correct position of the gyroscopic compass and, furthermore, a given change in one latitude produces a different settling point from the same change in a different latitude. While pendulosity, gyroscopic effect, etc., are usually so designed that the change in the settling point due to change of speed or course is produced with a minimum oscillation of the compass for the latitude in which the ship usually runs, it has been found, however, impossible to design a compass with sufficient directive and damping qualities to be a useful navigational instrument in which some oscillations will not be set up by sudden changes in the course of the ship, especially for changing latitudes. Such oscillations or deviations of the compass are very small and of limited duration, it should be understood, not being sufficient to effect or interfere with the compass as a navigational instrument but sufficient to warrant investigation and correction for ordnance work.

The object of the invention is then to produce a gyroscopic compass or system of gyroscopes sufficiently sensitive to maintain the true azimuth during changes in the course of the ship with much greater accuracy than is possible with the present type of compass or at least to vary its position in azimuth so slowly that it may be used as a base line for checking on the target. At the same time the value of the directive indications of the compass are not sacrificed.

Referring to the drawings in which what are now considered the preferred forms of the invention are shown:

Fig. 3 is a vertical section on an enlarged scale of the uppermost portion of Fig. 1 showing the support for the sensitive element and power means for driving the same.

Fig. 4 is a corresponding sectional view of a modification in the mounting of the support for the sensitive element.

Fig. 5 is a wiring diagram illustrating as simply as possible how both instruments are connected.

From the foregoing discussion it is evident that the seat of the troublesome variations and oscillations of the present type lies in the large pendulous factor represented in the Sperry compass by the heavy bail. On the other hand, the elimination or reduction of the size of the pendulous factor will seriously impair the directive power of the compass rendering it of such a long period that it would take hours for the settling point to be reached so that the compass would be in a continuous state of slow oscillation.

Figure 1:
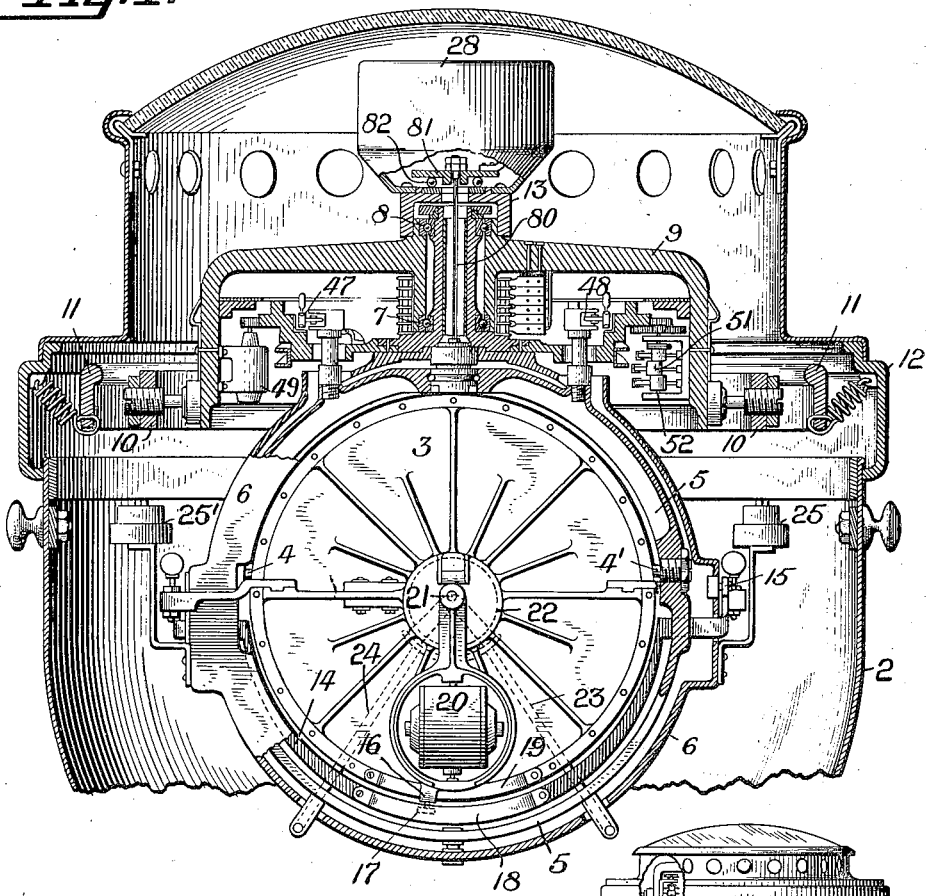
Fig. 1 is a north elevation, partly in section, of an improved gyroscopic compass or instrument embodying this invention but requiring an additional compass cooperating therewith for the best operation.
Figure 2:
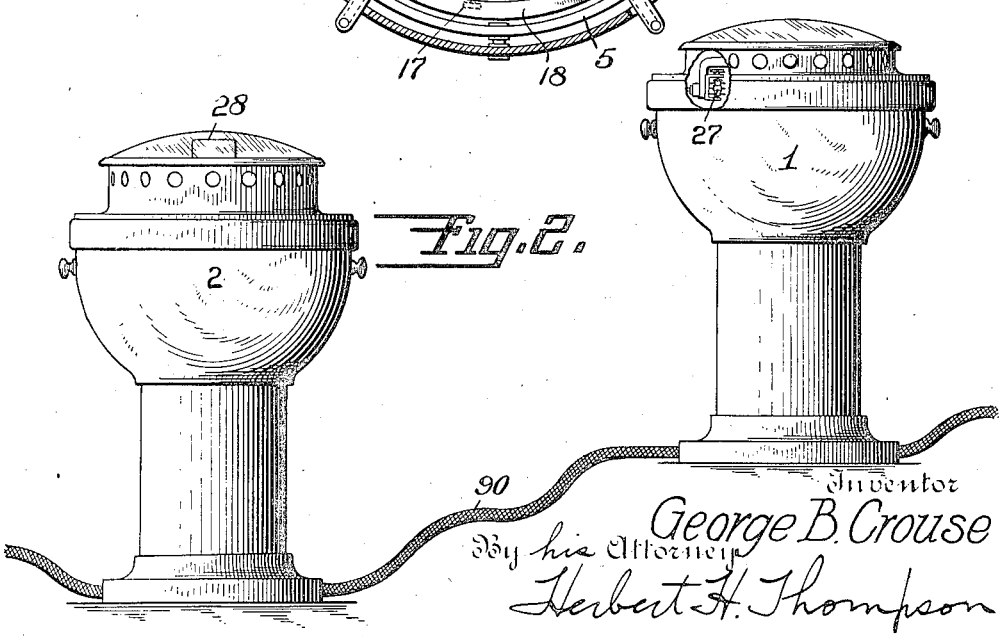
Fig. 2 is an elevation of the two instruments—first, a standard or navigational gyroscopic compass and, second, my improved gyroscopic compass, both of which I find desirable to employ.

According to my invention I propose to employ in conjunction with the standard navigational compass represented at 1 in Fig. 2 a second and what may be termed a secondary or ordnance compass or instrument 2 shown in detail in Fig. 1. Such instrument is shown as modeled on the well known Sperry battle compass but it should be understood, however, that the invention outlined hereinafter may be applied to other types of gyroscopic apparatus. The instrument comprises the usual rotor casing 3 in which is enclosed the electrically driven rotor and windings therefor (not shown). The rotor casing is mounted for oscillation about a horizontal axis in the vertical ring 5 on pivots 4, 4'. The vertical ring in turn is mounted for turning about a vertical axis in the outer follow-up element or support 6 which is also journalled for rotation about a vertical axis in bearings 7 and 8 in the supporting spider 9. The rotor casing 3 and vertical ring 5, or in other words all parts directly connected to or forming a part of the gyroscope itself are termed the sensitive element to distinguish from the follow-up element 6. Said spider may be suspended in the usual gimbals 10 and 11 in the supporting stand 12.

As is the practice in the Sperry battle compass the sensitive element is suspended by means of a fine wire or wires 80. According to my invention, however, instead of securing the upper portion of said wires 80 to the follow-up system I prefer to secure them to a separate rotatable member 81 which is shown as journalled on ball bearings 82 on top of a cap 13 secured to the spider. Said member 81 is preferably rotated by proper driven means as hereinafter described.

Preferably, as in the Sperry battle compass, the rotor casing is substantially balanced about the axis of pivots 4, 4' or is made very little pendulous about said axis. The weight or bail 14 is also shown as pivoted about pivots 15 substantially in line with pivots 4, 4' on the follow-up ring 6. The weight, however, according to my invention is made very much less than the standard bail of the Sperry compass. In other words, I prefer to greatly reduce the pendulous factor of the compass. In one successful embodiment of the invention this pendulous factor has been reduced from 85 pound inches to 15 pound inches with a corresponding change in the period of the compass from 85 minutes in the battle compass to 4 hours in my improved instrument and with even greater reduction in the deviations and oscillations due to changes in course and speed. As shown, the pendulosity of the bail may be further decreased by securing masses 25, 25' above the pivot points of the bail thereby increasing the period of the bail and further lessening the pendulosity of the compass. In a compass having such a slow period of oscillation the sluggishness of the compass in altering its plane of rotation is produced at the expense of the directive power, or in other words, its meridian seeking power. In order to give the compass a well defined settling point I prefer to greatly increase the damping by preferably increasing the eccentricity of the connection 16 between the bail 14 and the rotor casing, as shown in Fig. 1. Such connection is preferably movable or floating, being formed by a pair of rollers 17 guided in trackways 18 and 19 on the bail and compass casing, respectively. Such rollers are mounted on a long period pendulum such as the gyroscopic pendulum 20 pivoted about the pivot 21 on the side of the gyro casing. The usual compensating weights are indicated (in dotted lines) at 22, the weights being supported on vertical ring 5 by arms 23 and 24.

As above stated, in order that the device may possess sufficient directive power to rely upon for ordnance work an extraneous means controlled by an independent gyro compass is used to increase the directive power of the secondary compass. For this purpose some means is employed to exert a corrective torque on the secondary instrument which is controlled by the navigational compass. According to the present embodiment of the invention the support 81 for the sensitive element is controlled and rotated from the standard navigational compass 1 by means of a repeater motor or the like 26 operated from said transmitter 27 on the standard compass. In Fig. 2 a cable 90 carrying the transmission wires 91 (Fig. 5) connects the two instruments. Such repeated motor is shown as mounted on the upper portion of the housing 28, the pinion 29 on the shaft thereof meshing with the large gear 30 secured to shaft 31 on which are mounted pinion 32 and gear 33. Said pinion 32 is shown as meshing with a large gear 34 mounted on the shaft 35 journalled in the bracket 36 supporting the repeater motor. To the face of said gear 34 is secured a plate 37 having a slot 38 through which projects the pin 39 on plate 40 secured to said support 81. It will readily be seen, therefore, that the support 81 will be revolved by the repeater motor, and, therefore, with the proper connections the support 81 will be revolved with and controlled by the navigational compass 1. To ascertain whether or not the repeater motor is in synchronism with the master compass I may mount a repeater card 70 on gear 34 and a lubber's index 71 secured to bracket 36, the same being visible through apertures 72 and 73 and illuminated by lamp 74.

A hand synchronizing means is also shown in the form of a handle 41 to the shaft of which is secured the crown gear 42. The handle and crown gear are normally pressed outwardly by the spring 43 but on pressing inwardly on the same and turning the handle it will readily be seen that the crown gear 42 will be brought into mesh with the gear 33 and the same revolved to set the device by hand.

The connection between the compasses would perhaps be more clear by reference to the wiring diagram shown in Fig. 5. In said diagram the navigational compass is shown at the left hand corner and is represented merely by the transmitter 27 but it should be understood that it too is preferably equipped with the usual follow-up motor, contacts, and relay similar to the secondary compass and fully described in the U. S. Patent to E. A. Sperry 1,330,890, April 15, 1919, for navigational instruments. Said transmitter is shown in the usual form having a plurality of cams 44 mounted on a common shaft 44' and designed to open and close in the proper sequence a plurality of contacts 45 which are connected in circuit with the fields 46 on the repeater motor 26.

The follow-up element of the secondary compass is driven in the usual manner from the reversing contacts 47, 47' secured to the follow-up element and a trolley or brush 48 secured to the vertical ring 5 of the sensitive element (Fig. 1). Said contacts operate the reversible follow-up motor 49 through the usual relay 50 which serves not only to reduce sparking but also to maintain the follow-up element in a state of continuous oscillation. It will also be understood that the repeater motor 26 is also maintained in a state of continuous oscillation by reason of the oscillations of the transmitter 27 and navigational compass 1, as fully described in said patent to E. A. Sperry 1,300,890. The follow-up element also serves to drive in my improved compass the transmitter 51 which drives, directly or indirectly, the various fire control instruments on the ship. Said transmitter is also shown as comprising a plurality of cams 144 mounted on the shaft 52 represented as separate in the wiring diagram for the sake of clearness. Said cams operate to open and close in the proper sequence contacts 45' in circuit with the repeater motor 152 in the fire control instruments. Of course, it will be understood that the repeater motor 152 merely represents a large number of such motors employed in the intricate fire control systems in modern battleships.

In Fig. 4 is shown a modification for the mounting for the rotatable support 81. In said figure the support 81' instead of being journalled on top of the stationary cap 13 secured to the spider 9 is journalled on bearing member 54 secured to an extension 55 of the sleeve 56 forming a part of the follow-up element 6 of the compass. Said element in turn is shown as journalled in the thrust bearing 8 in the spider 9, the lower bearings 7 for the follow-up sleeve not being illustrated in this figure. By this means friction about the vertical axis is reduced, since both races of the ball bearing 82 are then maintained in a state of continuous oscillation.

According to this invention the supporting wires 80 perform several important functions—first, furnish a frictionless support for the sensitive element and, second, constitute a yielding or resilient connection between the member 81 actuated by the navigational compass and the sensitive element of the ordnance compass. It is, of course, apparent that the torsion, stiffness, etc., of said wires may be adjusted to give the best results. It has been found that the torsion of ordinary fine piano wires is sufficient to assist the compass in finding and settling upon the meridian.

The use of my invention is as follows: Ordinarily only the navigational instrument 1 would be employed in maneuvering the ship. In battle practice, however, or whenever it is desired to actuate the ordnance instruments the ordnance compass should also be brought into use and the repeater motor 26 connected to the transmitter 27 on the navigational compass. Assuming that both compasses are on the meridian, due to a sharp turn or sudden change in speed of the ship a temporary deviation of the navigational instrument is caused. This disturbing effect, however, will not affect the ordnance compass or at least affect the same materially less than the ordnance compass so that no disturbance will be produced therein. The temporary deviation of the navigational compass, however, will turn the motor 26 and thereby turn the plate 81 and produce a slight twisting in the wire 80 and thereby exert a weak torque about the vertical axis. Such torque, however, will have to produce precession about the horizontal axis before any movement about the vertical will result and being small and of short duration the navigational compass will have arrived at its new settling point and deviation ceased before the azimuth of the ordnance compass is materially affected. If the settling point has been changed a permanent slight twist will be introduced in the wire 80, thereby causing the ordnance compass to slowly assume the new position. The damping of such an apparatus, however, is made sufficiently powerful so as to make it substantially dead beat, in other words, so that it will not swing past the settling point. With such an arrangement it has been possible to produce sufficient accuracy for all the present needs of gun fire control and, furthermore, the change of azimuth in the ordnance compass will be sufficiently slow to allow checking on the target at intervals of 15 to 20 minutes, as during this period the ordnance compass will not have oscillated sufficiently to cause the gun to move off the target.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In gyro-ordnance apparatus, the combination with a gyroscopic compass, of a second gyroscopic instrument having a sensitive element rotatable in azimuth and a support for said element also rotatable in azimuth, a yielding connection between said support and element, and means controlled by said compass for turning said support.

2. A gyro-apparatus for ordnance including a sensitive element of low pendulosity and directive power, means for mounting the same for turning about a vertical axis, including a power driven member adjacent thereto mounted for turning about a vertical axis, and yielding means connecting said member and element, and a motor adapted to be controlled from another instrument for turning said member.

3. In gyroscopic apparatus, a pair of gyroscopic compasses having different periods of oscillation about the meridian, means connected to one compass for exerting a torque about the vertical axis thereof, and means responsive to the relative position of the other compass for controlling said means without reacting on said other compass.

4. In gyroscopic apparatus, a pair of gyroscopic compasses having different periods of oscillation about the meridian, means connected to the compass having the greater period of oscillation for exerting a torque about the vertical axis thereof, and means responsive to the relative movements of the other compass for controlling said means without reacting thereon.

5. A gyroscopic apparatus for indicating direction comprising a rotor and a bearing frame therefor, means for mounting the same for oscillation about horizontal axes and turning about a vertical axis, a second gyro directional apparatus and a power driven means adapted to be controlled from said second apparatus for exerting a torque on said frame about one of said axes.

6. A gyro-directional apparatus comprising a rotor and a bearing frame therefor, means for mounting the same for oscillation about horizontal axes and turning about a vertical axis, a second gyro-directional apparatus, a power driven support for said frame adapted to be controlled from said second apparatus, and yielding means connecting said support and frame.

7. A gyro-directional apparatus comprising a rotor and a bearing frame therefor, means for mounting the same for oscillation about horizontal axes and turning about a vertical axis, a follow-up member also turnable about said vertical axis, a power driven support adapted to be controlled from another instrument and journalled on said member, and a torsion suspension connecting said support and frame mounting means.

8. A suspension means for the sensitive element of gyroscopic compasses comprising the combination with the sensitive element, of a rotatable member from which the sensitive element is supported, a second rotatable member on which the first is journalled, means controlled by the sensitive element for turning and continuously oscillating one of said members, and means for turning the other member.

9. A suspension means for the sensitive element of gyroscopic compasses, comprising the combination with the sensitive element, of a rotatable member from which the sensitive element is supported, a second rotatable member on which the first is journalled, and means for continuously oscillating each of said members.

10. A suspension means for the sensitive element of gyroscopic compasses comprising the combination with the sensitive element, of a rotatable member from which the sensitive element is supported, a second rotatable member on which the first is journalled, means controlled by the sensitive element for continuously oscillating said second member and independently controlled means for turning the first member.

11. A gyroscopic apparatus for ordnance including a sensitive element of low pendulosity and directive power, means for mounting the same for turning about a vertical axis, a power driven member adjacent thereto mounted for turning about a vertical axis, yielding means connecting said member and element, a motor adapted to be controlled from another instrument for turning said member, and means for synchronizing said motor and member with said other instrument.

12. In a gyro-apparatus for ordnance control, in combination, a gyroscope having a pendulous factor rendering the same primarily responsive to the rotation of the earth and to acceleration forces, a second gyroscope having a relative less pendulous factor and power means connected to the latter gyroscope and controlled by the former for maintaining the position of the latter fixed with respect to the earth.

13. In a gyro-compass or the like, the combination with the sensitive element, of means for suspending the same, power-driven rotatable means for turning said suspending means, guide bearings for said element, and other power means for maintaining said bearings in a state of relative motion.

14. In a gyro-compass or the like, the combination with the sensitive element, of a follow-up element, guide bearings between said elements, power means for turning and oscillating said follow-up element, an independent support for said sensitive element, and power means for turning the said support.

In testimony whereof I have affixed my signature.

GEORGE B. CROUSE.